June 30, 1964   W. C. PFEFFERLE   3,138,948
HYDROGEN MEASURING SYSTEM
Filed Sept. 13, 1960

INVENTOR.
WILLIAM C. PFEFFERLE
BY Karl Huber
James E. Bryan
Alan C. Rose
ATTORNEYS

United States Patent Office 3,138,948
Patented June 30, 1964

3,138,948
HYDROGEN MEASURING SYSTEM
William C. Pfefferle, Middletown, N.J., assignor to Engelhard Industries, Inc., Newark, N.J., a corporation of Delaware
Filed Sept. 13, 1960, Ser. No. 55,638
3 Claims. (Cl. 73—27)

This invention relates to gas detection apparatus, and more particularly to electrical resistance type detectors for hydrogen gas.

While it has been known, in general, that the resistance of palladium or palladium-silver alloys changes with variations in hydrogen content, the prior experiments in this field have usually been based on the electrolytic charging of a bare and unsupported alloy element. Furthermore, the prior work has generally been performed under carefully controlled conditions both as to temperature, the absence of other gases, and freedom from vibrations, and not under practical plant conditions.

In accordance with an important aspect of the present invention, it has been determined that an improved practical resistance type detector for hydrogen gas may be made of a palladium containing metal element in a particular structural arrangement. For rapid response of the palladium metal containing element, it is desirable that it be very thin. Thus, the element is desirably less than 0.01 inch in thickness, and preferably less than 0.005 inch in thickness. Where there is no need for rapid response, thicker resistance wires or films may be used. In order to provide good electrical conductivity, and to avoid predominance of surface effects, the resistance elements should be at least 50 to 100 atoms thick; in the case of palladium-silver alloys, this corresponds to a thickness of 100 to 200 angstrom units, where an angstrom unit is equal to $10^{-8}$ centimeters. Palladium or palladium-silver alloys may be subject to changes in their crystalline structure with heating and cooling. Accordingly, with the very thin elements which are required for adequate speed response, the unsupported resistance elements may readily break. In accordance with one feature of the present invention, therefore, the palladium containing metal resistance wires are supported on a suitable insulating member or substrate.

To obtain the desired sensitivity with different partial pressures of hydrogen gas, it is desirable to change the temperature at which the resistance element is maintained. This may be accomplished by electrically heating the sensing element. Particularly at elevated temperatures, it is desirable to reduce the rate of heat conduction to the gas stream which is being measured. With high rates of heat flow, temperature measurements become erratic and unstable as the rate of flow of the gas stream varies, for example. In accordance with another feature of the invention, the palladium-containing resistance element may be coated with a thin, porous layer of heat and electrically insulating material. One suitable material which may be employed is powdered alumina baked over the element. This alumina coating permits rapid flow of the hydrogen to the palladium-containing resistance element, but greatly reduces heat loss from the element.

Other objects, features and advantages of the invention will be readily apparent from a consideration of the following detailed description, and from the drawings, in which.

Figure 1:
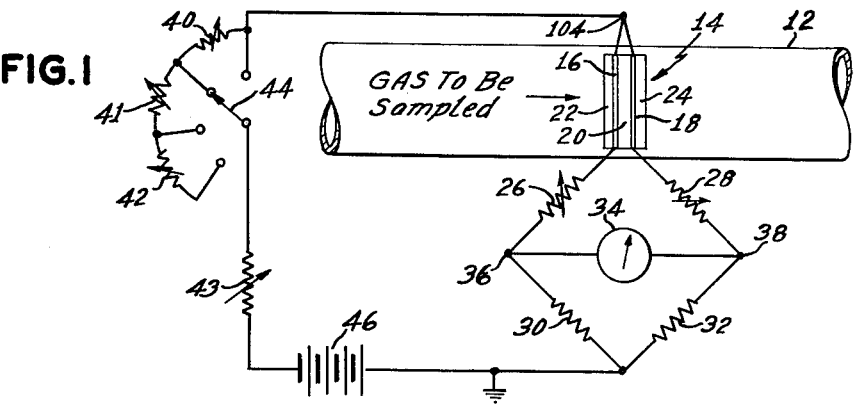
FIG. 1 is a schematic diagram of a representative detection system in accordance with the present invention.

Referring to the drawing, FIG. 1 shows a pipe 12 in which a hydrogen-containing gas flows. A sensing element 14 is shown located within the pipe 12. Sensing element 14 includes a palladium-containing resistance element 16 and a reference resistance element 18. The two resistance elements are both mounted on a support 20. The resistance element 16 is covered by a porous insulating layer 22 of a material such as alumina through which the hydrogen gas may diffuse. The reference palladium-containing resistance element 18 is covered by an impervious heat and electrically insulating layer 24. Thus, hydrogen gas has access to the sensing element 16 but not to the reference element 14, so that the resistance of one element will be changed with respect to the other. The hydrogen gas can be readily measured in a gas stream containing nitrogen, methane, other hydrocarbons, and a wide variety of other gases which do not permeate palladium to any appreciable extent.

With respect to the associated electrical circuitry, the sensing and reference elements 16 and 18 are located in a Wheatstone bridge circuit. This bridge circuit also includes the variable resistances 26 and 28 in series with elements 16 and 18, respectively, the additional resistors 30 and 32, and a meter 34 which is connected between the balance points 36 and 38 of the Wheatstone bridge. The meter 34 therefore measures the unbalance created by the presence of hydrogen gas in the resistance element 16 as compared with the hydrogen-free reference element 18.

As mentioned above, the sensitivity of the device is determined by the temperature at which the resistance elements 16 and 18 are maintained. The temperature of these resistance elements is adjusted by the switching network including resistors 40 through 43 and the switch 44, which control the power supplied by the electrical source 46. For high concentrations of hydrogen gas, the series resistance is made low so that the resistance elements 16 and 18 are at a relatively high temperature. Under these conditions, the full scale reading on meter 34 will be obtained only at relatively high partial pressures of hydrogen.

It may also be noted that the resistance characteristic with increasing hydrogen reaches a maximum or minimum and then reverses, as hydrogen content increases. This form of characteristic is shown, for example, at page 203 of a book entitled "Hydrogen in Metals," by Donald P. Smith, The University of Chicago Press, Chicago, Illinois, 1948. It is therefore necessary to adjust the temperature of the resistance elements 16 and 18 to confine the resistance versus hydrogen content function to a region where the resistance may have but a single value for the broadest range of hydrogen gas partial pressures which may occur in the gas stream under test.

Figure 2:
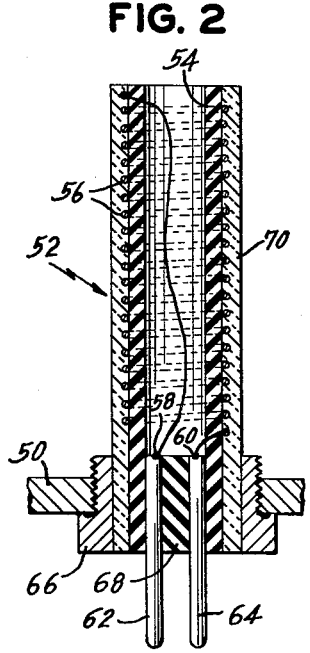
FIG. 2 shows a resistance element in accordance with the present invention.

FIG. 2 of the drawings shows a wall 50 of a gas-containing chamber into which a probe 52 extends. The probe 52 includes an insulating cylinder 54 and a resistance element 56 which is wound upon the cylindrical support 54. The coil 56 has its terminals 58 and 60 secured respectively to the terminal pins 62 and 64 of the probe. The probe 52 also includes a suitable screw-threaded metallic base member 66 which makes sealing engagement with the wall 50 of the gas chamber. The terminal pins 62 and 64 are sealed through the base member 66 by suitable insulating material 68.

A layer of porous heat and electrically insulating material 70 covers the resistance sensing element 56. This outer layer 70 reduces heat losses from the resistance element 56 and avoids changes in temperature as the rate of flow of the gases increases or decreases.

It is desirable that the reference element 18 of FIG. 1 be subject to substantially the same heat conditions as the sensing element 16. Accordingly, a duplicate probe such as that shown in FIG. 2 may be provided. In the case of the reference probe however, the insulating material 54 and the layer 70 would be of a material such as silica-free lead borate glass which is impervious to hydrogen. Under these conditions, the sensing and the reference palladium-containing wires would be maintained at approximately the same temperature, thus eliminating one possible source of error.

Figure 3:
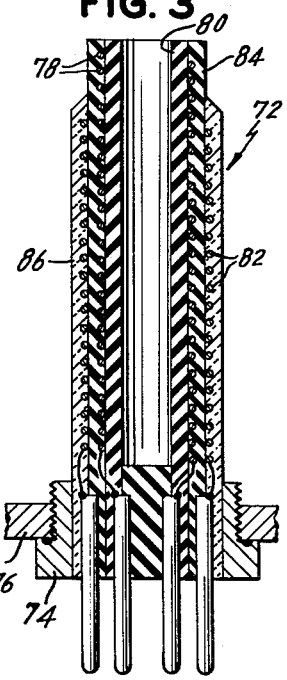
FIGS. 3 and 4 represent embodiments of the invention in which sensing and reference elements are mounted in concentric form, in accordance with the present invention.

In the case of the arrangement shown in FIG. 3, the sensing and reference resistance elements are included in a single probe 72. As in the case of the probe 52, the probe 72 of FIG. 3 includes a base 74 for sealing the probe through the wall 76 of the gas chamber. In the arrangement of FIG. 3, the reference element 78 is wound on the inner insulating member 80 and the sensing resistance element 82 is wound on the insulating layer 84 which shields the inner reference element 78. The inner cylinder 80 and the cylinder 84, which is essentially a coating over the resistance element 78, are both formed of material through which hydrogen cannot penetrate. The cylinders 80 and 84 are shown in the drawings as insulating material and may in fact be formed of lead borate glass. The outer coating 86 is of a porous heat-insulating material which reduces heat conduction from sensing element 82, while permitting the flow of hydrogen into the resistance element.

Figure 4:
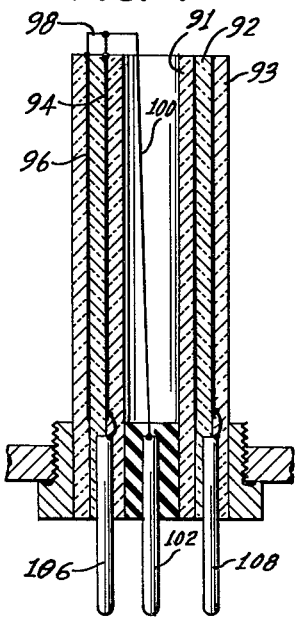

The arrangement of FIG. 4 is very similar to that of FIG. 3 in the coaxial arrangement of the resistance elements. However, in the case of FIG. 4, the resistance elements are in the form of thin films instead of wires. In the arrangement of FIG. 4, the three concentric insulating cylinders 91, 92 and 93 include the two inner cylinders 91 and 92 of material such as lead borate glass which is impervious to hydrogen gas, and the outer cylinder 93 which is of porous heat resistant material. The two cylindrical palladium-containing films 94 and 96, which are sandwiched between the insulating cylinders, are connected at their upper ends by the electrical conductor 98. The conductor 98 is, in turn, connected by lead 100 to the central terminal pin 102. The terminal pin 102 of FIG. 4 corresponds to the junction point 104 as shown in FIG. 1. The lower end of the inner reference palladium-containing sleeve 94 is connected to terminal pin 106, and the lower end of the outer palladium-containing sensing element is connected to terminal pin 108.

Figure 6:
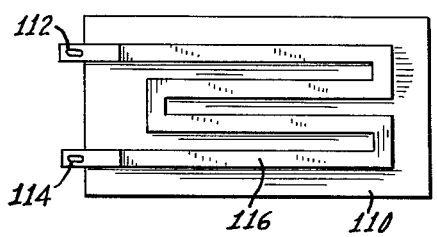
FIGS. 5 and 6 are two views of another embodiment of the sensing element.
Figure 5:
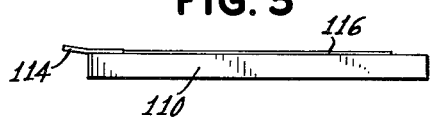

The resistance elements may also take the form as shown in FIGS. 5 and 6 of the drawings. The illustrated structure includes a substrate 110, two silver contact terminals 112 and 114, and a thin layer of a palladium-containing metal 116. The layer 116 may be applied to the substrate 110 by any suitable method such as electroplating, vapor deposition, or the like. The substrate or base 110 for the sensing element may be of glass, fused silica or the like. For the purposes of the reference element, the substrate would be of a material which is impervious to hydrogen gas. In addition, of course, if the reference electrode is to be located in the gas chamber, it would be covered with an additional layer of material which is impervious to hydrogen. The arrangement of FIG. 5, when used as the sensing element, could also have a coating of material such as porous alumina for use in reducing heat losses from the resistance element.

In any of the arrangements described above, instead of employing a reference element which is within the gas stream, the reference element may be maintained at the same temperature as the sensing element in the gas stream by placing it in intimate contact with the chamber through which the gas is flowing, or by similar techniques. In addition, all four of the bridge resistance elements of FIG. 1 may be of the same material, and two diagonal elements such as resistors 16 and 32 of FIG. 1 may be exposed to the gas stream, to provide a cumulative shift in the voltage between points 36 and 38. These elements may be arranged structurally as shown in other figures of the drawing, and the other two reference bridge elements may be located outside the chamber in heat transferring relationship with it. In addition, the two resistors 26 and 28 of FIG. 1 may be replaced by a tapped variable resistor having its ends connected to resistance elements 16 and 18, and its center tap connected to the power input point 104. Other similar circuits may be used.

The alloying of silver with palladium is preferably in the range between 25 percent and 40 percent silver. With this high percentage of silver, the catalytic effect of the heated palladium is reduced. This is particularly advantageous to minimize olefin hydrogenation in cases where the gas stream would be subject to this reaction. More generally, however, pure palladium, palladium silver or other palladium containing alloys, such as palladium gold, having high absorption characteristics for hydrogen, may be employed.

In summarizing various aspects of the present invention, it may be noted that it is proposed that hydrogen may be selectively detected in a mixture of certain gases, in view of its highly selective permeation of palladium and the low permeation by most other gases. The problem of a possible ambiguity in the resistance vs. hydrogen concentration characteristic is avoided by the provision of a range selection arrangement. The thickness of the element is selected to avoid the time lag which would be inherent in an overly thick element; on the other hand, the element is specified as being at least 100 or 200 angstrom units thick so that bulk effects predominate over surface effects. Furthermore, the problems of mechanical strength and of resistance instability due to variable heat loss may be overcome by the use of a support and a porous heat insulating member, respectively.

In addition to the measurement of hydrogen, other gases which are selectively permeable in a particular metal may be detected and measured by electrical resistance apparatus as described above. Such arrangements are generally limited only by the permeability of the metal which is employed as the sensing element to other gases with which the gas to be detected is associated, and the reversibility of the permeation. Thus, oxygen permeates silver to a much greater extent than most other gases, including nitrogen, hydrogen and argon. In addition to silver, gold may be used with oxygen as a selective sensing element. In the case of hydrogen, palladium-gold alloys or iron may be used as the sensing element instead of the pure palladium or palladium-silver alloys mentioned above. The selective absorption of nitrogen in titanium may also be utilized, particularly at elevated temperatures, for resistance detection. In general, however the ratio of solubility of the gas to be detected in the metal of sensing element, to that of the other gases which are present, must be very high to avoid errors which might be produced as the other gases diffuse into the sensing element. With only moderately high solubility ratios, the accuracy of the detection apparatus is significantly reduced.

For alarm type systems, reversibility is not necessary and may not be desirable; for such systems replaceable detector elements would be used. For example, the system of FIG. 1 may be provided with a heated copper element. Then, in the presence of either oxygen or hydrogen sulfide, in combination with other gases which do not permeate or react with copper, the resistance of the copper will be a function of the amount of copper which is chemically reacted. Similar reactions of metals with other selected gases will be apparent to those skilled in the art.

It is to be understood that the above described arrangements are illustrative of the application of the principles

What is claimed is:

1. Apparatus for measuring the hydrogen content of a gas comprising a support member, a resistance element made of a palladium alloy and mounted on the support member, a coating of a porous heat and electrically insulating material on the resistance element and covering it, said coating being sufficiently porous to permit hydrogen in a gas to come in contact with the resistance element, means for heating said element and means for detecting variations in the electrical resistance of said element with changes in the hydrogen content of a gas in contact with the element.

2. Apparatus in accordance with claim 1 in which said coating is alumina.

3. Apparatus in accordance with claim 1 including a second resistance element made of a palladium alloy and mounted on a support member, at least a major portion of each of the two resistance elements being mounted on and supported by the corresponding support member, and means for heating said second resistance element, said second resistance element being coated and covered with a heat and electrically insulating material which is impervious to hydrogen, and said means for detecting variations in the electrical resistance of the first mentioned resistance element being connected to detect said variations with reference to the resistance of the second resistance element.

References Cited in the file of this patent

UNITED STATES PATENTS

| | | |
|---|---|---|
| 2,080,953 | Rensch | May 18, 1937 |
| 2,866,330 | Axt et al. | Dec. 30, 1958 |

OTHER REFERENCES

Smith et al.: Gases in Metals, published by American Society for Metals, Cleveland, Ohio, 1953.